(12) United States Patent
Ono

(10) Patent No.: US 9,007,634 B2
(45) Date of Patent: Apr. 14, 2015

(54) INFORMATION PROCESSING DEVICE, INFORMATION PROCESSING METHOD, AND COMPUTER PROGRAM PRODUCT

(71) Applicants: Kabushiki Kaisha Toshiba, Minato-ku, Tokyo (JP); Toshiba Solutions Corporation, Minato-ku, Tokyo (JP)

(72) Inventor: Soichiro Ono, Tokyo (JP)

(73) Assignees: Kabushiki Kaisha Toshiba, Tokyo (JP); Toshiba Solutions Corporation, Tokyo (JP)

(*) Notice: Subject to any disclaimer, the term of this patent is extended or adjusted under 35 U.S.C. 154(b) by 0 days.

(21) Appl. No.: 13/846,036

(22) Filed: Mar. 18, 2013

(65) Prior Publication Data

US 2014/0071462 A1   Mar. 13, 2014

Related U.S. Application Data

(63) Continuation of application No. PCT/JP2012/073360, filed on Sep. 12, 2012.

(51) Int. Cl.
*G06F 15/00* (2006.01)
*H04N 1/00* (2006.01)
*H04N 1/387* (2006.01)

(52) U.S. Cl.
CPC .......... *H04N 1/00681* (2013.01); *H04N 1/387* (2013.01); *H04N 1/3873* (2013.01)

(58) Field of Classification Search
CPC .......................... H04N 1/00204; G06F 3/1296
USPC ........................................................ 358/1.15
See application file for complete search history.

(56) References Cited

U.S. PATENT DOCUMENTS

| 2004/0223197 | A1 | 11/2004 | Ohta et al. |
| 2005/0219616 | A1 | 10/2005 | Furuta et al. |
| 2006/0170968 | A1* | 8/2006 | Maki et al. .................. 358/1.15 |
| 2009/0190168 | A1 | 7/2009 | Furuta et al. |

FOREIGN PATENT DOCUMENTS

| JP | 2001-028032 | 1/2001 |
| JP | 2001-111789 | 4/2001 |
| JP | 2004-246577 | 9/2004 |
| JP | 2005-122682 | 5/2005 |
| JP | 2009-100262 | 5/2009 |

OTHER PUBLICATIONS

International Search Report for PCT/JP2012/073360 mailed on Oct. 16, 2012.

* cited by examiner

*Primary Examiner* — Saeid Ebrahimi Dehkordy
(74) *Attorney, Agent, or Firm* — Amin, Turocy & Watson, LLP

(57) ABSTRACT

According to an embodiment, an information processing device includes a receiving unit, a detection unit, a generation unit, and an output unit. The receiving unit is configured to receive an original image. The detection unit is configured to detect a write region in which additional information is to be written, from the original image. The generation unit is configured to generate a position specifying image for specifying a position of the write region in the original image, the position specifying image being to be added to a predetermined region in the original image. The output unit is configured to output the position specifying image.

7 Claims, 9 Drawing Sheets

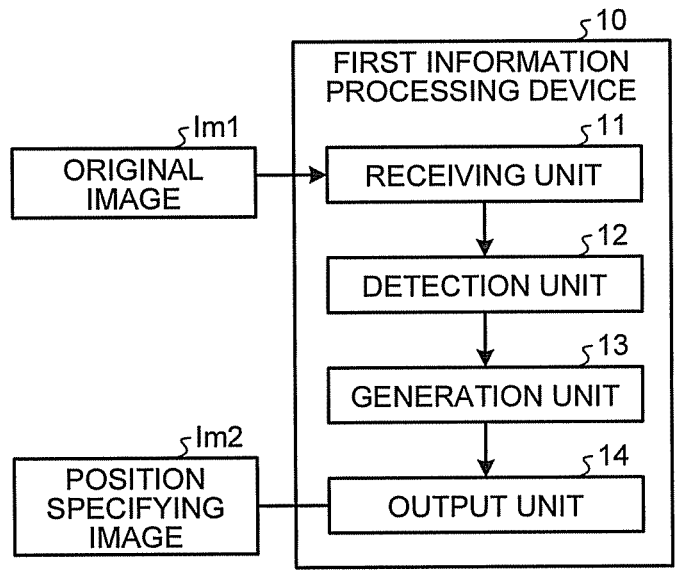
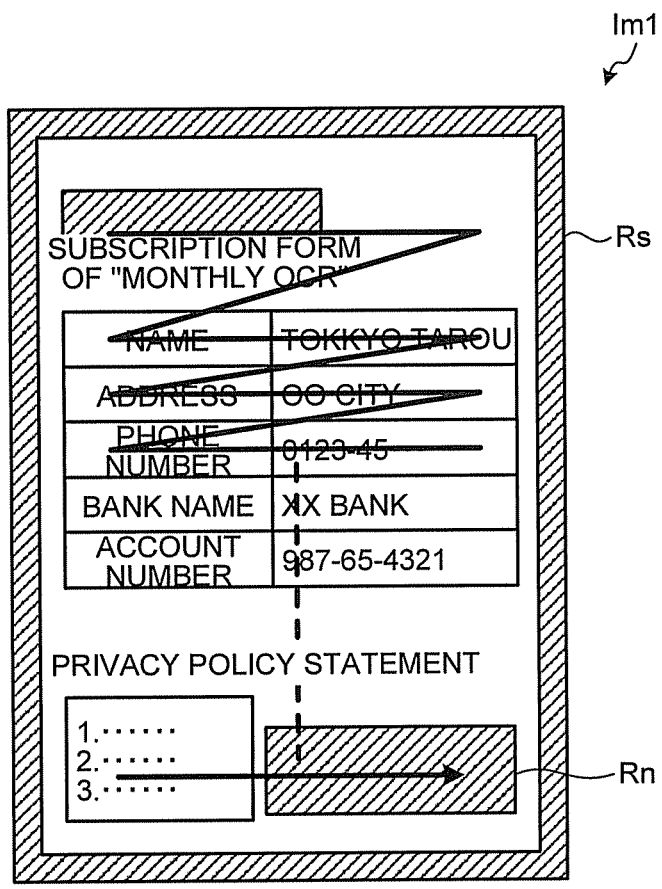

INFORMATION PROCESSING DEVICE, INFORMATION PROCESSING METHOD, AND COMPUTER PROGRAM PRODUCT

CROSS-REFERENCE TO RELATED APPLICATION

This application is, a continuation of PCT international application Ser. No. PCT/JP2012/073360 filed on Sep. 12, 2012 which designates the United States, the entire contents of which are incorporated herein by reference.

FIELD

Embodiments described herein relate generally to an information processing device, an information processing method, and a computer program product.

BACKGROUND

A technology of writing additional information in an optically-readable format such as characters or symbols, bar codes, and two-dimensional codes in an input document or the like using a visible or invisible ink has been widely used in, for example, the field of a ledger sheet process. In the field of the ledger sheet process, a process number and the like are written as the additional information in the ledger sheet with entries already written therein, and the process number and the like written in the ledger sheet are optically read to be utilized for the subsequent processes.

For the correctness in reading, the additional information makes it a rule to be written at a position where no overlapping with other pre-existing entries occurs. However, when the format of a document or the like is unknown, the additional information may be written on the pre-existing entries so as to be overlapped with each other, and thus the additional information may not be correctly read. In addition, when a wide variety of document formats are handled, a region enough to write the additional information may not be acquired in the same position with respect to the whole formats in common. For this reason, there has been a demand for a technology through which a write region of the additional information can be appropriately acquired with respect to the documents of an unknown format and a wide variety of formats, and the additional information written in the region can be correctly recognized.

BRIEF DESCRIPTION OF THE DRAWINGS

FIG. 2 is a block diagram illustrating the functional configuration of a first information processing device;

FIG. 3 is a schematic diagram conceptually illustrating an exemplary process in which a detection unit detects a write region from an original image;

DETAILED DESCRIPTION

According to an embodiment, an information processing device includes a receiving unit, a detection unit, a generation unit, and an output unit. The receiving unit is configured to receive an original image. The detection unit is configured to detect a write region in which additional information is to be written, from the original image. The generation unit is configured to generate a position specifying image for specifying a position of the write region in the original image, the position specifying image being to be added to a predetermined region in the original image. The output unit is configured to output the position specifying image.

Hereinafter, embodiments of an information processing device, an information processing method, and a program will be described with reference to the drawings. The embodiments to be described below are examples of the application to a form processing system which is useful for various processes in which process numbers as additional information are written in ledger sheets with entries already written therein and then the process numbers are read to identify the ledger sheets. However, the applicable system is not limited to the above system.

Form Processing System

Figure 1:
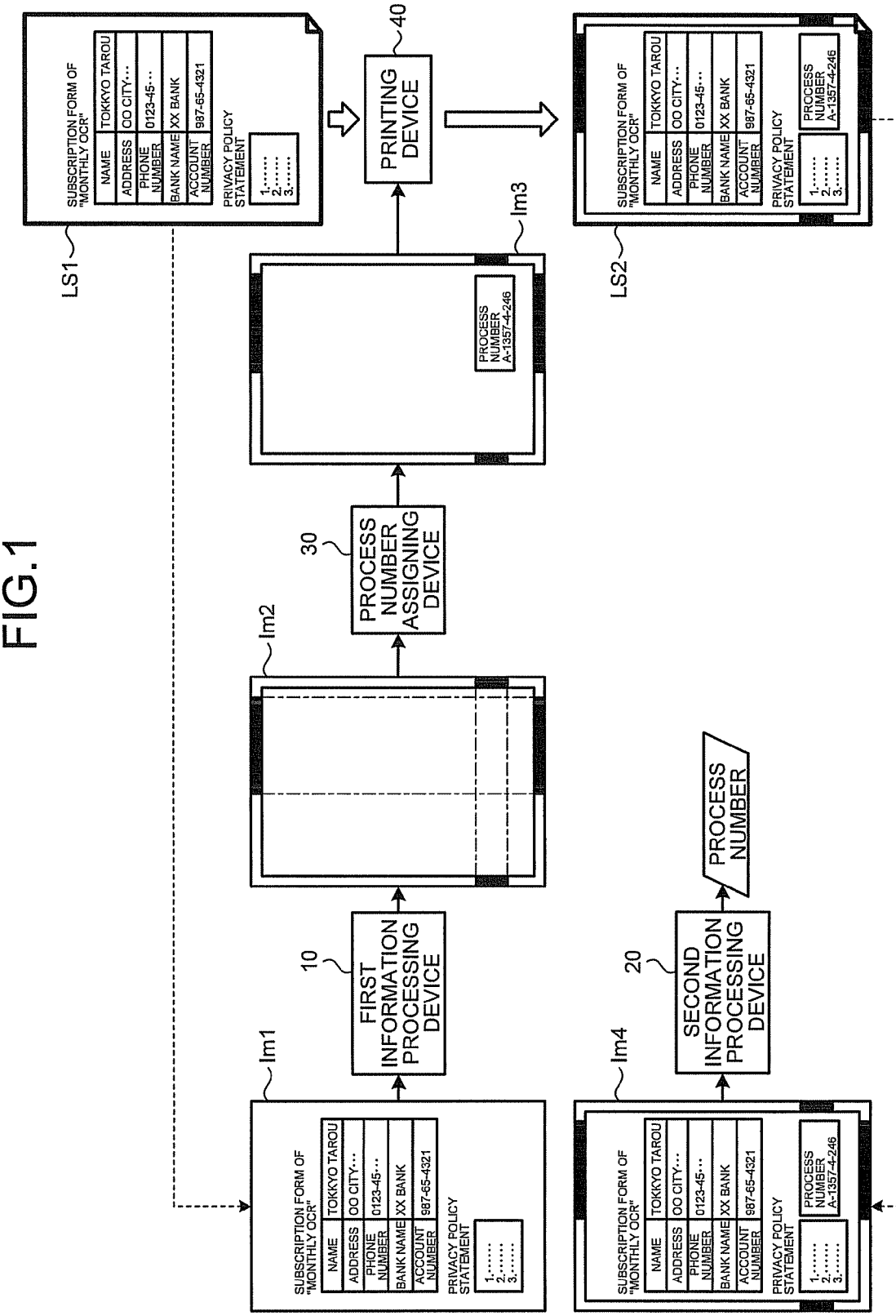
FIG. 1 is a diagram schematically illustrating a configuration of a form processing system.

FIG. 1 is a diagram schematically illustrating a configuration of a form processing system according to an embodiment. The form processing system according to the embodiment is provided with a first information processing device 10, a second information processing device 20, a process number assigning device 30, and a printing device 40.

The first information processing device 10 receives an original image Im1, detects a write region to which the process number is written as the additional information from the original image Im1, generates a position specifying image Im2 which is an image which is added to a predetermined region (for example, a predetermined width of region on the peripheral of the image) of the original image Im1, and used to specify a position of the write region in the original image Im1, and outputs the position specifying image Im2. Hereinafter, the predetermined region serving as a region to be added with the position specifying image Im2 will be referred to as an image addition region.

The original image Im1 which is input to the first information processing device 10 is image data which is obtained through a scanner (not illustrated) or the like by optically reading a ledger sheet LS1 with entries already written therein. The original image Im1 may be directly input to the first information processing device 10 through the scanner or the like, or may be stored once in a predetermined storage device and then input to the first information processing device 10 from the storage device. In addition, the original image Im1 may be input to the first information processing device 10 via a network from an external device which is connected to the first information processing device 10 through the network.

The position specifying image Im2 which is output by the first information processing device 10 is input to the process number assigning device 30. In addition, the first information processing device 10 sends the coordinate values of a representative point (for example, the center point of the write region) of the write region in the original image Im1 to the process number assigning device 30 besides the position specifying image Im2. The process number assigning device 30 specifies the position of the write region based on the coordinate values, and superimpose an image written with the process number corresponding to the ledger sheet LS1 onto the position specifying image Im2 at the position of the write region, so that a print target image Im3 is generated. Then, the print target image Im3 is output. The print target image Im3 output from the process number assigning device 30 is input to the printing device 40.

Further, the print target image Im3 may be generated as follows: the position specifying image Im2 output from the first information processing device 10 is directly input to the printing device 40; the process number assigning device 30 inputs the image in which the process number is written at the position of the write region to the printing device 40; then, these images are superimposed in the printing device 40.

Besides the input of the print target image Im3, the printing device 40 is supplied with the ledger sheet LS1 (a print medium) corresponding to the original image Im1. The printing device 40 prints the print target image Im3 input from the process number assigning device 30 on the ledger sheet LS1 to be superimposed to each other. With this configuration, the position specifying image Im2 is printed in the region on the ledger sheet LS1 corresponding to the image addition region of the original image Im1, the printing device 40 discharges a ledger sheet LS2 on which the process number is printed at the position on the ledger sheet LS1 corresponding to the write region of the original image Im1.

The second information processing device 20 receives a processed image Im4, based on the position specifying image Im2 included in the processed image Im4, specifies a position of the write region in the processed image Im4, and recognizes and outputs the process number written in the write region. The process number output from the second information processing device 20 is utilized in a ledger sheet process which is performed since then.

The processed image Im4 input to the second information processing device 20 is image data which is obtained through a scanner (not illustrated) or the like by optically reading the ledger sheet LS2 which is discharged from the printing device 40, and includes the printed position specifying image Im2 and the printed process number. In other words, the processed image Im4 is an image formed as follows: the position specifying image Im2 output from the first information processing device 10 is added to the image addition region of the original image Im1, and the process number is written by the process number assigning device 30 in the write region detected by the first information processing device 10. Similarly to the original image Im1, the processed image Im4 may be directly input to the second information processing device 20 through a scanner or the like. Alternatively, after being stored in a predetermined storage device once, the processed image may be input from the storage device to the second information processing device 20. In addition, the processed image Im4 may be input from the external device, which is connected to the second information processing device 20 through the network, to the second information processing device 20 through the network.

First Information Processing Device

Next, the first information processing device 10 will be described in detail. FIG. 2 is a block diagram illustrating a functional configuration of the first information processing device 10. The first information processing device 10 includes a receiving unit 11, a detection unit 12, a generation unit 13, an output unit 14 as functional components as illustrated in FIG. 2.

The receiving unit 11 receives the original image Im1. The original image Im1, as needed, is subjected to pre-processes, for example, a binarization, a tilt correction process, and the like for a color image. Then, the pre-processed image is sent to the detection unit 12.

The detection unit 12 detects the write region to be written by the process number from a region except the image addition region in the original image Im1. In the embodiment, it is assumed that a region having a predetermined width (a width small enough to be considered as no entries therein) in the peripheral of the original image Im1 is set in advance as the image addition region.

FIG. 3 is a schematic diagram conceptually illustrating an exemplary process in which the detection unit 12 detects the write region from the original image Im1. For example, as illustrated in FIG. 3, the detection unit 12 scans a region in the original image Im1 except the image addition region Rs; obtains parameters x and y which make an evaluation function represented by the following Equation (1) minimized and sets the parameters as x0 and y0; and detects a rectangular region of 2w (height)×2h (width) around the pixel (x0, y0), as a write region Rn.

$$F(x, y) = \sum_{\substack{x-w \le p < x+w \\ y-h \le q < y+h}} f(p, q) \tag{1}$$

where $w \le x < W - w$ and $h \le y < H - h$.

Herein, the values of the parameters x and y are constrained such that the rectangular region is not overlapped with the image addition region Rs. In addition, it is assumed that the size of the write region Rn is constant and the values of the parameters w and h are set in advance to fix the size of the rectangular region. Further, the size of the write region Rn, for example, may be set to a variable size which is designated by the process number assigning device 30 or the like. In this case, the values of the parameters w and h which determine the size of the rectangular region are determined depending on the size of the designated write region Rn.

In addition, it is assumed that the original image Im1 is a W (width)×H (height) rectangular image which has been quantized, and f(x, y) represents a pixel value at a position (x, y) which is standardized to be maximized in a foreground color (in which the entries are present) and to be minimized in a background color (in which no entries are present). In this case, the least region which is overlapped with the pre-existing entries is detected as the write region Rn in the original image Im1.

Returning to FIG. 2, the generation unit 13 generates the position specifying image Im2 which is an optically-readable image for specifying the position of the write region detected by the detection unit 12. Various shapes of the position specifying image Im2 may be considered. Herein, as an example, the position specifying image Im2 is generated such that the position of the image addition region overlapped with the write region detected by the detection unit 12 in the horizontal or vertical direction of the original image Im1 is distinguished from the positions of the other image addition regions on the assumption that a region having a predetermined width in the peripheral of the original image Im1 is determined in advance as the image addition region.

Figure 4:
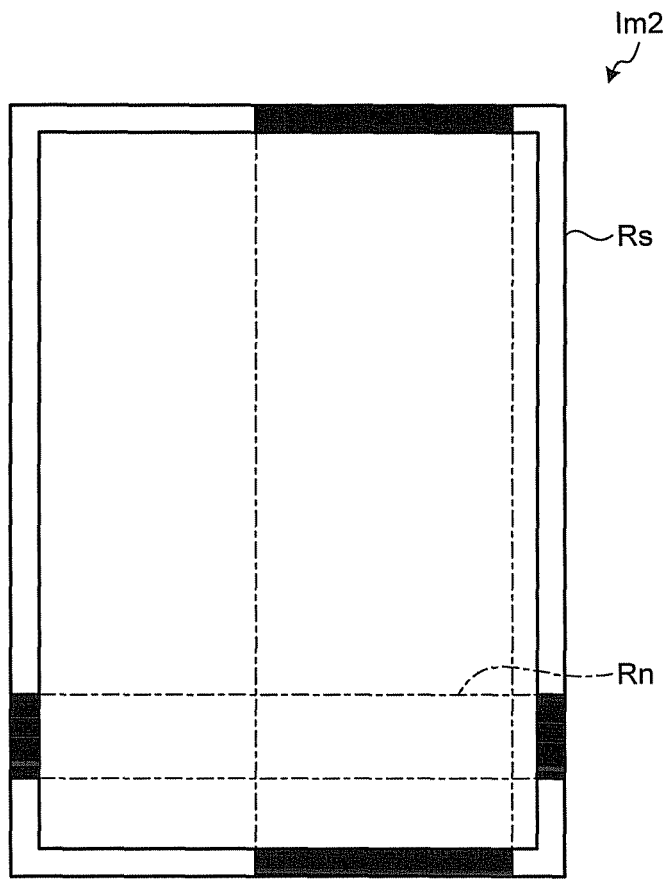
FIG. 4 is a diagram illustrating an example of a position specifying image which is generated by a generation unit.

FIG. 4 is a diagram illustrating an example of the position specifying image Im2 which is generated by the generation unit 13. The position specifying image Im2 illustrated in FIG. 4 is an image which includes, for example, black markings at the positions of the image addition region Rs with which projections of the write region Rn detected by the detection unit 12 are intersected with in the horizontal and vertical directions. In the position specifying image Im2 illustrated in FIG. 4, the position of the write region Rn detected by the detection unit 12 can be specified based on the marking position of the region corresponding to a first side of the original image Im1 and the marking position of the region corresponding to a second side intersected with the first side of the original image Im1 in the image addition region Rs.

Further, in the position specifying image Im2 illustrated in FIG. 4, the position of the write region Rn can be specified based on two marking positions corresponding to two intersecting sides of the original image Im1. However, as illustrated in FIG. 4, four marking positions corresponding to four sides of the original image Im1 are illustrated in order to obtain redundant pieces of information for specifying the position of the write region Rn. Therefore, for example, even when one (or two) of the four markings is difficult to be appropriately read due to the overlapping with a pre-existing entry, the position of the write region Rn may be correctly specified based on the positions of the other markings.

Returning to FIG. 2, the output unit 14 converts the position specifying image Im2 generated by the generation unit 13 into an image in a format, as needed, which can be handled by the process number assigning device 30, and outputs the resultant image to the process number assigning device 30. Further, as described above, the output unit 14 also outputs coordinate values of the representative point of the write region in the original image Im1 to the process number assigning device 30 independently from the position specifying image Im2.

Figure 5:
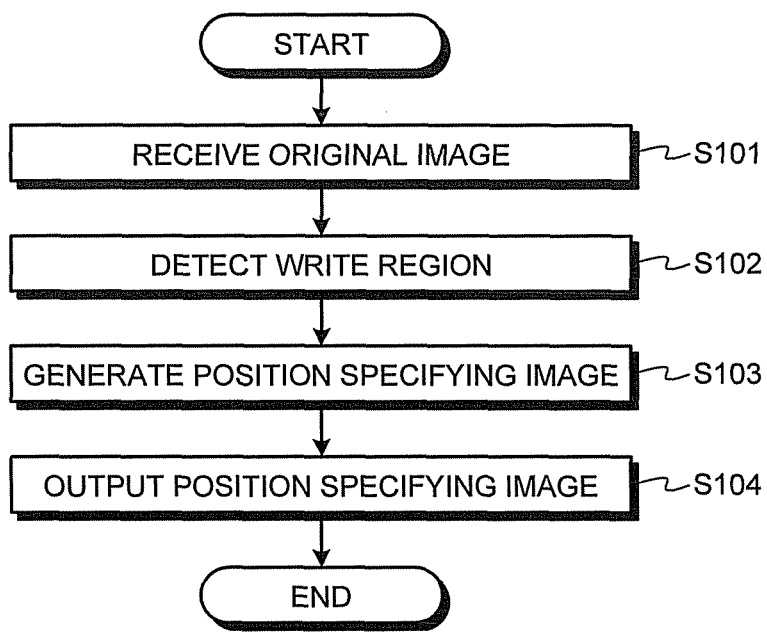
FIG. 5 is a flowchart illustrating the sequence of a series of processes which are performed by the first information processing device.

FIG. 5 is a flowchart illustrating the sequence of a series of processes which are performed by the first information processing device 10. When the first information processing device 10 is activated, the receiving unit 11 first receives the original image Im1 (step S101). Next, the detection unit 12 detects the write region from the original image Im1 received in step S101 (step S102). Next, the generation unit 13 generates the position specifying image Im2 which is used for specifying the position of the write region detected in step S102 (step S103). Finally, the output unit 14 outputs the position specifying image Im2 generated in step S103 to the process number assigning device 30 (step S104).

Second Information Processing Device

Figure 6:
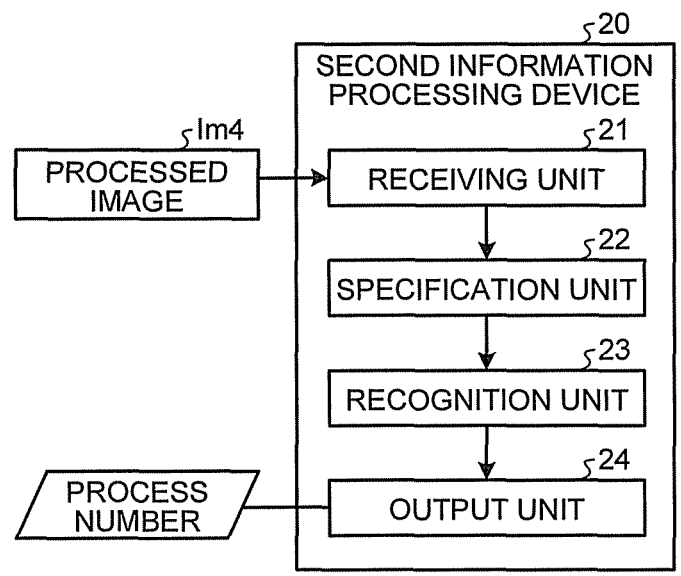
FIG. 6 is a block diagram illustrating the functional configuration of a second information processing device.

Next, the second information processing device 20 will be described in more detail. FIG. 6 is a block diagram illustrating the functional configuration of the second information processing device 20. The second information processing device 20, as illustrated in FIG. 6, includes a receiving unit 21, a specification unit 22, a recognition unit 23, and an output unit 24 as functional components.

The receiving unit 21 receives the processed image Im4. The processed image Im4, as needed, is subjected to pre-processes, for example, a binarization, a tilt correction process, and the like for a color image. Then, the pre-processed image is sent to the specification unit 22.

The specification unit 22 specifies the position of the write region in the processed image Im4 based on the position specifying image Im2 included in the processed image Im4.

Figure 7:
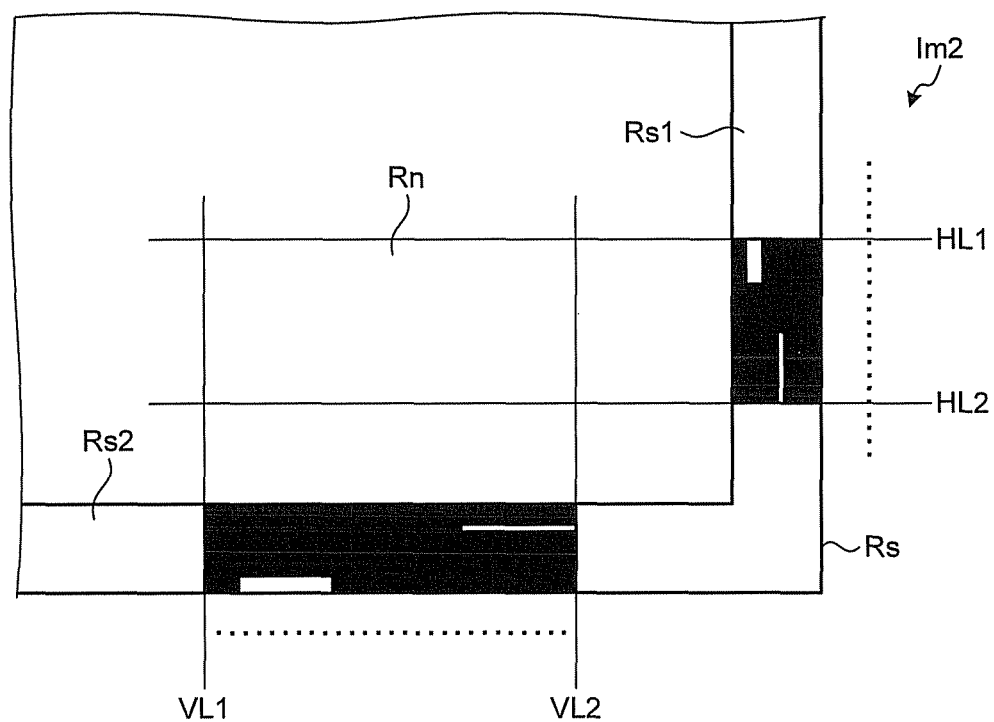
FIG. 7 is a schematic diagram conceptually illustrating an exemplary process in which a specification unit detects a write region from a processed image.

FIG. 7 is a schematic diagram conceptually illustrating an exemplary process in which the specification unit 22 detects the write region Rn from the processed image Im4. Herein, as described above, the position specifying image Im2 is assumed as an image which includes, for example, black markings at the positions of the image addition region Rs with which projections of the write region Rn are intersected in the horizontal and vertical directions.

In this case, as illustrated in FIG. 7, the specification unit 22 performs the following processes for every horizontal line which includes the pixels aligned in the horizontal direction in a region Rs1 which extends in the vertical direction in the image addition region Rs: obtaining a ratio occupied by the pixels of the foreground color (for example, black) in the pixels constituting the region Rs1; and setting a position of which the ratio occupied by the pixels of the foreground color exceeds a predetermined threshold value as the marking position. Then, the specification unit 22 specifies two horizontal lines (a first boundary horizontal line HL1 and a second boundary horizontal line HL2) which are boundaries between the marking position and no marking positions. The specification unit 22 further performs the following processes for every vertical line which includes the pixels aligned in the vertical direction in the region Rs2 which extends in the horizontal direction in the image addition region Rs: obtaining a ratio occupied by the pixels of the foreground color (for example, black) in the pixels constituting the region Rs2; and setting a position of which the ratio occupied by the pixels of the foreground color exceeds a predetermined threshold value as the marking position. Then, the specification unit 22 specifies two vertical lines (a first boundary vertical line VL1 and a second boundary vertical line VL2) which are boundaries between the marking position and no marking positions. Then, the specification unit 22 specifies the write region Rn based on a region surrounded by four line segments: the first boundary horizontal line HL1; the second boundary horizontal line HL2; the first boundary vertical line VL1; and the second boundary vertical line VL2.

As described above, the specification unit 22 compares the ratio occupied by the pixels of the foreground color with the threshold value to specify the marking position. Therefore, for example, even when a part of the marking portion is reversed in color (for example, white) to that of the background color due to a print failure, a read failure, or the like, it is possible to correctly recognize the marking position and thus to exactly specify the write region Rn.

Returning to FIG. 6, the recognition unit 23 recognizes the process number written in the write region which is specified by the specification unit 22, that is, the process number which is written as the additional information in the write region of the ledger sheet LS1 by the process number assigning device 30, using a known technology such as character recognition.

The output unit 24 outputs the process number which is recognized by the recognition unit 23.

Figure 8:
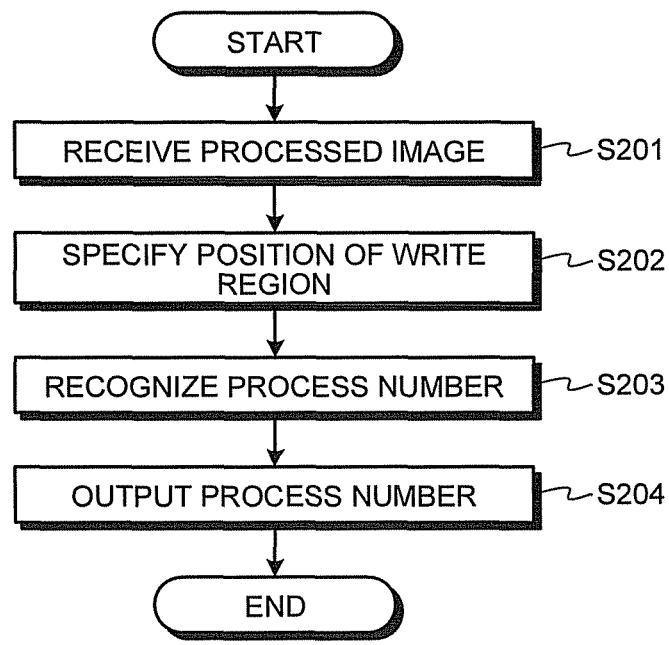
FIG. 8 is a flowchart illustrating the sequence of a series of processes which are performed by the second information processing device.

FIG. 8 is a flowchart illustrating the sequence of a series of processes which are performed by the second information processing device 20. When the second information processing device 20 is activated, the receiving unit 21 first receives the processed image Im4 (step S201). Next, the specification unit 22 specifies the position of the write region in the processed image Im4 based on the position specifying image Im2 included in the processed image Im4 received in step S201 (step S202). Next, the recognition unit 23 recognizes the process number which is written in the write region recognized in step S202 (step S203). Finally, the output unit 24 outputs the process number recognized in step S203 (step S204).

Hitherto, as described above in detail while giving a specific example, the first information processing device 10 of the form processing system according to the embodiment receives the original image Im1 which is obtained by optically reading the ledger sheet LS1, detecting the write region which is used to write the process number (the additional information) from the original image Im1, generating the position specifying image Im2 which is used to specify the position of the write region, and outputting the position specifying image Im2. In addition, the second information processing device 20 receives the processed image Im4 obtained by optically reading the ledger sheet LS2 which includes the process number printed in the write region of the ledger sheet LS1 and the position specifying image Im2 printed in the image addition region, specifying the position of the write region based on the position specifying image Im2 included the processed image Im4, and recognizing the process number written in the write region. Therefore, even when the ledger sheet is unknown or various in templates, the form processing system can appropriately obtain the region where the process number (the additional information to the ledger sheet) is written, and correctly recognize the additional information which is written in the region.

Further, in the above-mentioned embodiment, the description has been made in connection with an aspect of the position specifying image Im2. However, other variations other than the above-mentioned example can be considered as the aspect of the position specifying image Im2. Hereinbelow, other aspects of the position specifying image Im2 will be described as modifications.

First Modification

Figure 9:
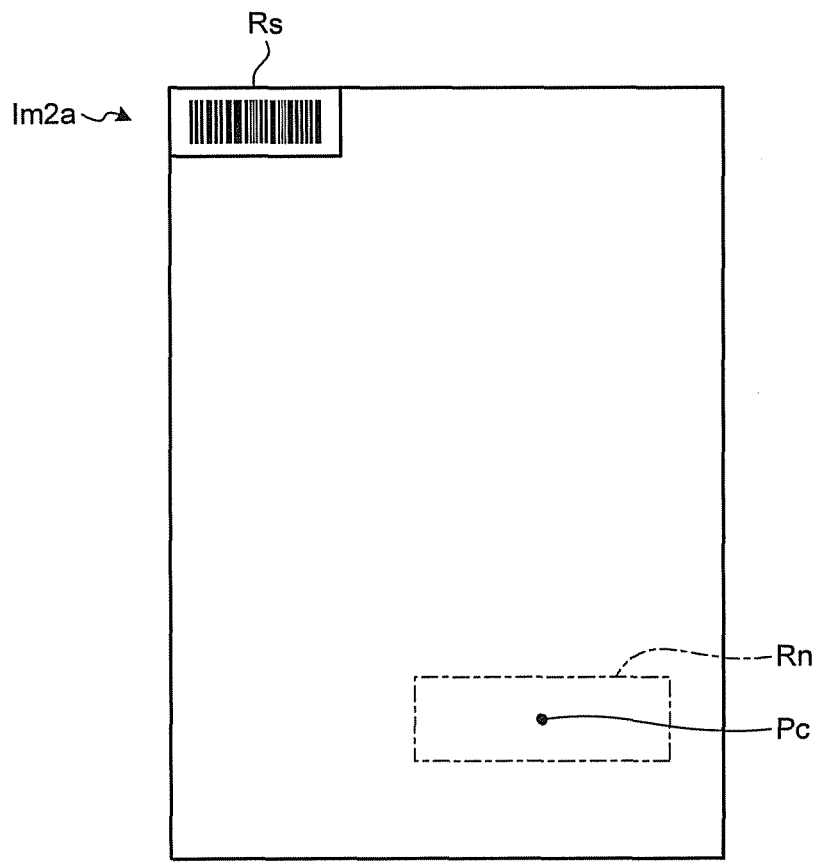
FIG. 9 is a diagram illustrating a position specifying image of a first modification.

FIG. 9 is a diagram illustrating a position specifying image Im2a of a first modification. In the first modification, the description will be made on the assumption that a small part of the peripheral region of the original image Im1 is set at the image addition region Rs in advance. In the image addition region Rs, the generation unit 13 of the first information processing device 10 generates an image with a bar code as the position specifying image Im2a, in which the bar code is disposed to represent the coordinate values of the representative point (for example, the center point Pc) of the write region Rn detected by the detection unit 12.

In a case of the first modification, the specification unit 22 of the second information processing device 20 reads the bar code of the position specifying image Im2a included in the processed image Im4. Therefore, the position of the write region Rn in the processed image Im4 can be specified.

Further, the position specifying image Im2a of the first modification may dispose, instead of the bar code, a two-dimensional code representing the coordinate values of the representative point of the write region Rn or a numeral value representing the coordinate values in the image addition region Rs. In addition, the position specifying image Im2a of the first modification may dispose not only the coordinate values of the representative point of the write region Rn, but also the bar code including other pieces of information such as the size of the write region Rn, the two-dimensional code, and the numeral value in the image addition region Rs.

Second Modification

Figure 10:
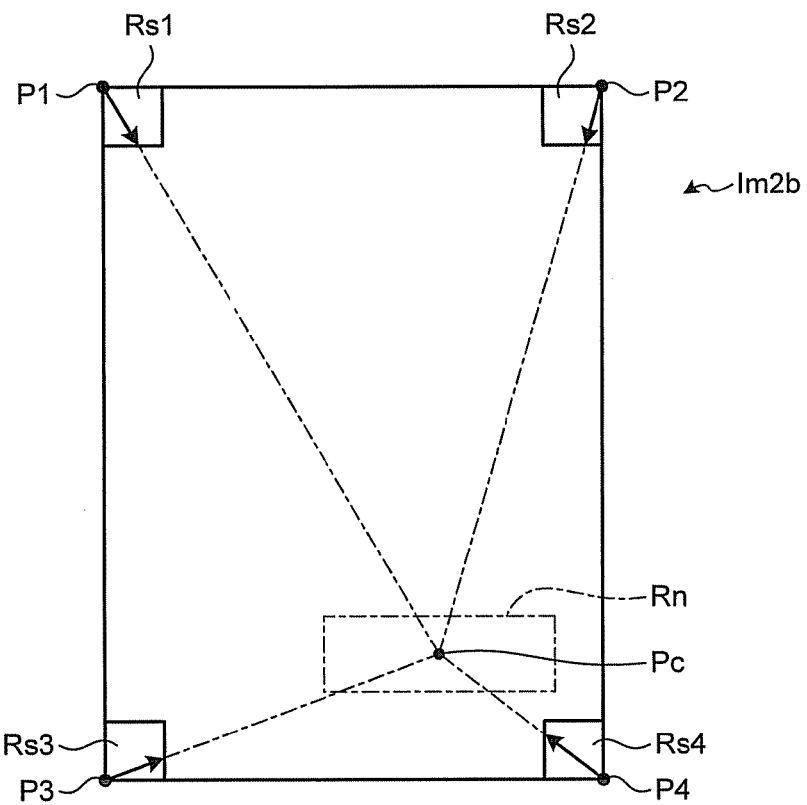
FIG. 10 is a diagram illustrating a position specifying image of a second modification.

FIG. 10 is a diagram illustrating a position specifying image Im2b of a second modification. In the second modification, the description will be made on the assumption that four rectangular regions Rs1 to Rs4 having a predetermined size are determined in advance as the image addition regions Rs which are positioned at four corners of the original image Im1. The generation unit 13 of the first information processing device 10 generates an image, as the position specifying image Im2b, in which four arrows (or solid lines) representing directions from the representative points of these four rectangular regions Rs1 to Rs4 in these four rectangular regions Rs1 to Rs4 to the representative point of the write region Rn are disposed.

For example, the representative points of the four rectangular regions Rs1 to Rs4 are set as the vertexes P1 to P4 of the corners of the respective images. In a case where the representative point of the write region Rn is set as the center point Pc of the write region Rn, the generation unit 13 generates, as illustrated in FIG. 10, an image as the position specifying image Im2b in which: the arrow indicating a direction from the left upper vertex P1 of the image to the center point Pc of the write region Rn is disposed in the rectangular region Rs1 which is positioned in the left upper portion of the image; the arrow indicating a direction from the right upper vertex P2 of the image to the center point Pc of the write region Rn is disposed in the rectangular region Rs2 which is positioned in the right upper portion of the image; the arrow indicating a direction from the left lower vertex P3 of the image to the center point Pc of the write region Rn is disposed in the rectangular region Rs3 which is positioned in the left lower portion of the image; and the arrow indicating a direction from the right lower vertex P4 of the image to the center point Pc of the write region Rn is disposed in the rectangular region Rs4 which is positioned in the right lower portion of the image.

In a case of the second modification, the specification unit 22 of the second information processing device 20 first estimates the inclinations of the arrows (or the solid lines) disposed in the respective rectangular region Rs1 to Rs4 using a known method such as the Hough transform or the least square method with respect to the four rectangular regions Rs1 to Rs4 of the position specifying image Im2b included in the processed image Im4. Then, the specification unit 22 expresses the four arrows (or the solid lines) in an expression of $a_i x + b_i y + c = 0$ (where, i=1, 2, 3, and 4; $a^2 + b^2 = 1$) and obtains a point, as the representative point (for example, the center point Pc) of the write region Rn, at which the square sum of distances to the four arrows (or the solid lines) is minimized. The point may be obtained as a point (x, y) derived as a solution of the following linear Equation (2). In this case, parameter N represents the number of arrows (or the solid lines).

$$\sum_{i=0}^{N-1} \begin{pmatrix} a_i^2 & a_i b_i \\ a_i b_i & b_i^2 \end{pmatrix} \begin{pmatrix} x \\ y \end{pmatrix} = \sum_{i=0}^{N-1} c_i \begin{pmatrix} a_i \\ b_i \end{pmatrix} \quad (2)$$

Using the above methods, the specification unit 22 obtains the coordinate values of the representative point (for example, the center point Pc) of the write region Rn. Therefore, the position of the write region Rn in the processed image Im4 can be specified.

Further, on the assumption that the four rectangular regions Rs1 to Rs4 are determined as the image addition regions Rs in advance, the position specifying image Im2b illustrated in FIG. 10 disposes the arrows indicating the directions from the representative points P1 to P4 of the respective rectangular regions Rs1 to Rs4 to the center point Pc of the write region Rn in the four rectangular regions Rs1 to Rs4. However, the position specifying image Im2b of the second modification may be an image in which the arrows (or the solid lines) are disposed in at least two rectangular regions. For example, in a case where the image with the arrows (or the solid lines) in the two rectangular region is used as the position specifying image Im2b, an intersection of the two arrows (or the solid lines) included in the position specifying image Im2b is obtained as the representative point of the write region Rn. Therefore, the position of the write region Rn can be specified. In this case, similarly to the position specifying image Im2b illustrated in FIG. 10, the arrows (or the solid lines) are disposed in the four rectangular regions Rs1 to Rs4, so that the redundant pieces of information for specifying the position of the write region Rn can be obtained. For example, even when one (or two) of the four arrows (or the solid lines) is difficult to be appropriately read due to the overlapping with a pre-existing entry, the position of the write region Rn may be correctly specified using the other arrows (or the solid lines).

In addition, in the position specifying image Im2b of the second modification, an additional small region may be provided besides the four rectangular regions Rs1 to Rs4 in which the arrows (or the solid lines) are disposed as described above. In the additional small region, information representing the size of the write region Rn may be disposed.

Third Modification

Figure 11:
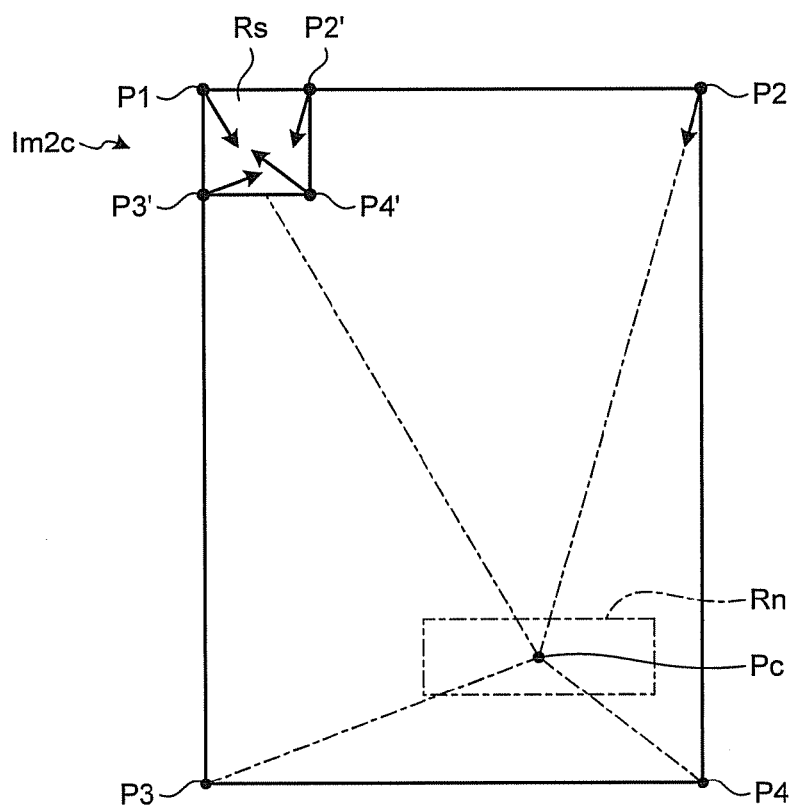
FIG. 11 is a diagram illustrating a position specifying image of a third modification.

FIG. 11 is a diagram illustrating a position specifying image Im2c of a third modification. On the assumption that a predetermined size of the rectangular region disposed in a corner portion (for example, the left upper corner portion of the image) of the original image Im1 is determined as the image addition region Rs in advance, the position specifying image Im2c of the third modification includes the four arrows (or the solid lines) illustrated in the second modification which are integrated in one image addition region Rs.

For example, in a case where the region of the left upper corner portion of the image is set to as the image addition region Rs, the generation unit 13 of the first information processing device 10 generates an image, as the position specifying image Im2c in which: the arrow indicating a direction from the left upper vertex P1 of the image to the center point Pc of the write region Rn is disposed in the image addition region Rs with the vertex P1 as the base point; the arrow indicating a direction from the right upper vertex P2 of the image to the center point Pc of the write region Rn is disposed in the image addition region Rs with a right upper vertex P2' of the image addition region Rs as the starting point; the arrow indicating a direction from the left lower vertex P3 of the image to the center point Pc of the write region Rn is disposed in the image addition region Rs with a left lower vertex P3' of the image addition region Rs as the starting point; and the arrow indicating a direction from the right lower vertex P4 of the image to the center point Pc of the write region Rn is disposed in the image addition region Rs with a right lower vertex P4' of the image addition region Rs as the starting point.

In a case of the third modification, the specification unit 22 of the second information processing device 20 estimates the inclinations of the four arrows (or the solid lines) disposed in the image addition region Rs using a known method such as the Hough transform or the least square method with respect to the image addition region Rs of the position specifying image Im2c included in the processed image Im4. Then, the coordinate values of the representative point (for example, the center point Pc) of the write region Rn is obtained by the similar method to the second modification. Therefore, the position of the write region Rn in the processed image Im4 can be specified.

Further, the position specifying image Im2c illustrated in FIG. 11 is an image with the four arrows (or the solid lines) disposed in the image addition region Rs, but may be an image which includes at least two arrows (or the solid lines) similarly to the second modification. In this case, similarly to the position specifying image Im2c illustrated in FIG. 11, the four arrows (or the solid lines) are disposed in the image addition region Rs, so that the redundant pieces of information for specifying the position of the write region Rn can be obtained similarly to the second modification. In addition, the position specifying image Im2c illustrated in FIG. 11 has been provided as an example in which the left upper corner portion of the image is set as the image addition region Rs. However, another corner portion of the image may be set as the image addition region Rs, and a plurality of arrows (or the solid lines) may be integrated in the image addition region Rs. Furthermore, a plurality of corner portions of the image each may be provided with the image addition region Rs, and the plurality of image addition regions Rs each may be provided with the plurality of arrows (or the solid lines) integrated therein. In this case, it is possible to further increase redundancy in the information for specifying the positions of the write regions Rn.

In addition, in the position specifying image Im2c of the third modification, an additional small region may be provided besides the image addition region Rs in which the arrows (or the solid lines) are interposed as described above. In the additional small region, information representing the size of the write region Rn may be disposed.

Fourth Modification

Figure 12:
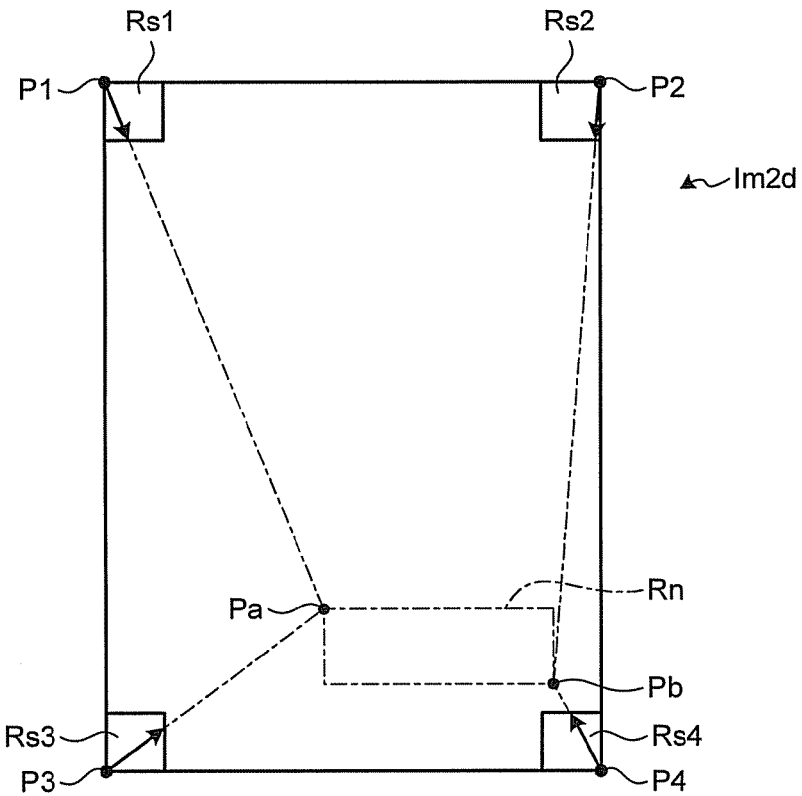
FIG. 12 is a diagram illustrating a position specifying image of a fourth modification.

FIG. 12 is a diagram illustrating a position specifying image Im2d of a fourth modification. In the fourth modification, similarly to the second modification, the description will be made on the assumption that four rectangular regions Rs1 to Rs4 having a predetermined size are determined in advance as the image addition regions Rs which are positioned at four corners of the original image Im1. In addition, in the fourth modification, two vertexes (the left upper vertex Pa and the right lower vertex Pb of the write region Rn in the example of FIG. 12) pairing the opposing corners of the write region Rn are set as the representative points of the write region Rn.

In a case of the fourth modification, the generation unit 13 of the first information processing device 10 generates, for example, as illustrated in FIG. 12, an image as the position specifying image Im2d in which: the arrow indicating a direction from the left upper vertex P1 of the image to the left upper vertex Pa of the write region Rn is disposed in the rectangular region Rs1 which is positioned in the left upper portion of the image; the arrow indicating a direction from the right upper vertex P2 of the image to the right lower vertex Pb of the write region Rn is disposed in the rectangular region Rs2 which is positioned in the right upper portion of the image; the arrow indicating a direction from the left lower vertex P3 of the image to the left upper vertex Pa of the write region Rn is disposed in the rectangular region Rs3 which is positioned in the left lower portion of the image; and the arrow indicating a direction from the right lower vertex P4 of the image to the right lower vertex Pb of the write region Rn is disposed in the rectangular region Rs4 which is positioned in the right lower portion of the image.

In the case of the fourth modification, the specification unit 22 of the second information processing device 20 first estimates the inclinations of the arrows (or the solid lines) which are disposed in the four rectangular regions Rs1 to Rs4 of the position specifying image Im2*d* included in the processed image Im4 using the similar method to the second modification. Then, the specification unit 22 obtains the intersection between the arrow (or the solid line) disposed in the rectangular region Rs1 and the arrow (or the solid line) disposed in the rectangular region Rs3 as the left upper vertex Pa of the write region Rn, and obtains the intersection between the arrow (or the solid line) disposed in the rectangular region Rs2 and the arrow (or the solid line) disposed in the rectangular region Rs4 as the right lower vertex Pb of the write region Rn, thereby being able specifying the position of the write region Rn.

Further, in the position specifying image Im2*d* of the fourth modification, an additional small region may be provided besides the four rectangular regions Rs1 to Rs4 in which the arrows (or the solid lines) are disposed as described above. In the additional small region, information representing the size of the write region Rn may be disposed. Therefore, even though a part of the four arrows (or the solid lines) of the position specifying image Im2*d* is missed due to a print failure, a read failure, or the like, the size of the write region Rn can be recognized, and thus the position of the write region Rn can be correctly specified.

Fifth Modification

Figure 13:
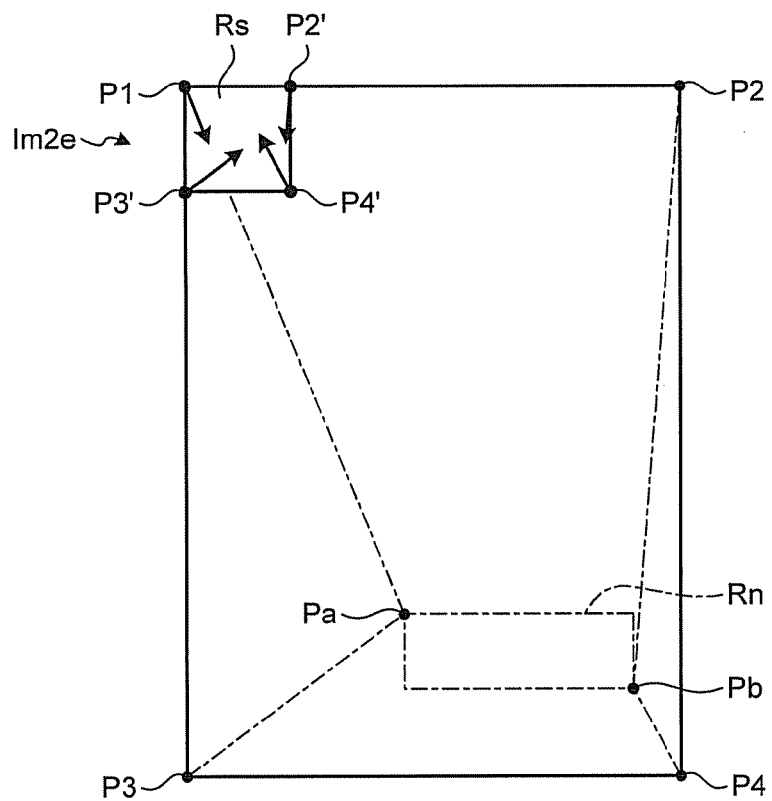
FIG. 13 is a diagram illustrating a position specifying image of a fifth modification.

FIG. 13 is a diagram illustrating a position specifying image Im2*e* of a fifth modification. Similarly to the third modification, on the assumption that a predetermined size of the rectangular region positioned in one corner portion (for example, the left upper corner portion of the image) of the original image Im1 is determined as the image addition region Rs in advance, the position specifying image Im2*e* of the fifth modification is an image in which the four arrows (or the solid lines) illustrated in the fourth modification are integrated in one image addition region Rs.

For example, in a case where the region of the left upper corner portion of the image is set as the image addition region Rs, the generation unit 13 of the first information processing device 10 generates an image as the position specifying image Im2*e* in which: the arrow indicating a direction from the left upper vertex P1 of the image to the left upper vertex Pa of the write region Rn is disposed in the image addition region Rs with the vertex P1 as the base point; the arrow indicating a direction from the right upper vertex P2 of the image to the right lower vertex Pb of the write region Rn is disposed in the image addition region Rs with the right upper vertex P2' of the image addition region Rs as the starting point; the arrow indicating a direction from the left lower vertex P3 of the image to the left upper vertex Pa of the write region Rn is disposed in the image addition region Rs with the left lower vertex P3' of the image addition region Rs as the starting point; and the arrow indicating a direction from the right lower vertex P4 of the image to the right lower vertex Pb of the write region Rn is disposed in the image addition region Rs with the right lower vertex P4' of the image addition region Rs as the starting point.

In a case of the fifth modification, the specification unit 22 of the second information processing device 20 estimates the inclinations of the four arrows (or the solid lines) of the position specifying image Im2*e* included in the processed image Im4 similarly to the third modification, and obtains the coordinate values of the two vertexes (for example, the left upper vertex Pa and the right lower vertex Pb) pairing the opposing corners of the write region Rn using the similar method to the fourth modification. Therefore, the position of the write region Rn in the processed image Im4 can be specified. Further, the position specifying image Im2*e* illustrated in FIG. 13 has been provided as an example in which the left upper corner portion of the image as the image addition region Rs. However, another corner portion of the image may be set as the image addition region Rs, and a plurality of arrows (or the solid lines) may be integrated and disposed in the image addition region Rs. Furthermore, a plurality of corner portions of the image each may be provided with the image addition region Rs, and the plurality of image addition regions Rs each may be provided with a plurality of arrows (or the solid lines) integrated and disposed therein. In this case, it is possible to increase redundancy in the information for specifying the positions of the write regions Rn.

In addition, in the position specifying image Im2*e* of the fifth modification, an additional small region may be provided besides the image addition region Rs in which the arrows (or the solid lines) are integrated and disposed therein as described above. In the additional small region, information representing the size of the write region Rn may be disposed.

Sixth Modification

Figure 14:
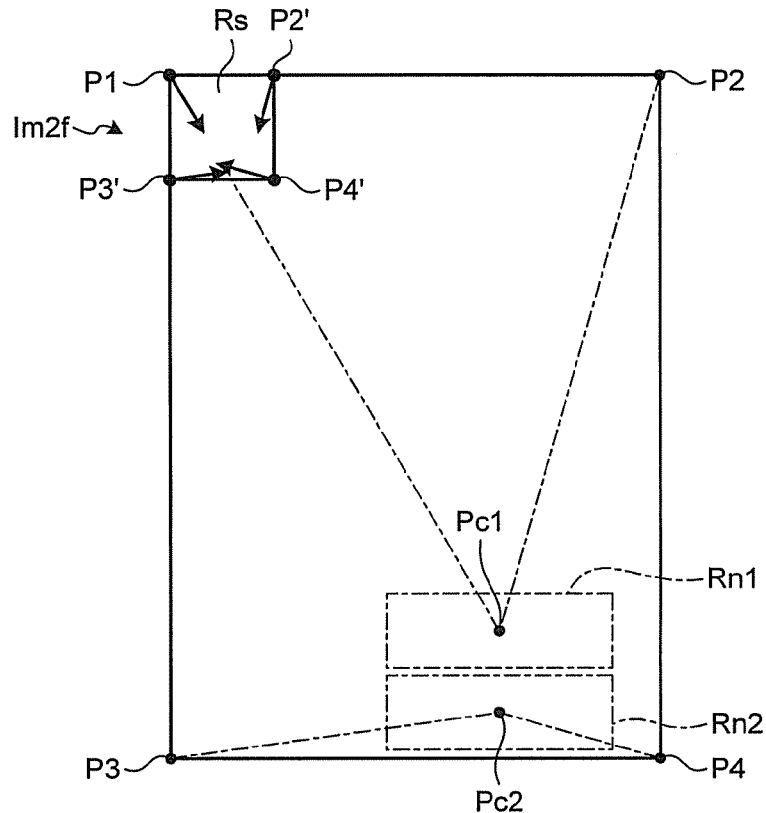
FIG. 14 is a diagram illustrating a position specifying image of a sixth modification.

FIG. 14 is a diagram illustrating a position specifying image Im2*f* of a sixth modifications. The sixth modification is an example in a case where the detection unit 12 of the first information processing device 10 detects the two write regions Rn1 and Rn2 from the original image Im1. The position specifying image Im2*f* of the sixth modification is an image to be used for specifying the positions of the two write regions Rn1 and Rn2; it has the similar pattern to, for example, the position specifying image Im2*c* of the third modification.

For example, the representative point of the write region Rn1 is set as the center point Pc1 of the write region Rn1, and the representative point of the write region Rn2 is set as the center point Pc2 of the write region Rn2. In a case where the region of the left upper corner portion of the image is set as the image addition region Rs, the generation unit 13 of the first information processing device 10 generates an image as the position specifying image Im2*f* in which: the arrow indicating a direction from the left upper vertex P1 of the image to the center point Pct of the write region Rn1 is disposed in the image addition region Rs with the vertex P1 as the base point; the arrow indicating a direction from the right upper vertex P2 of the image to the center point Pc1 of the write region Rn1 is disposed in the image addition region Rs with the right upper vertex P2' of the image addition region Rs as the starting point; the arrow indicating a direction from the left lower vertex P3 of the image to the center point Pc2 of the write region Rn2 is disposed in the image addition region Rs with the left lower vertex P3' of the image addition region Rs as the starting point; and the arrow indicating a direction from the right lower vertex P4 of the image to the center point Pc2 of the write region Rn2 is disposed in the image addition region Rs with the right lower vertex P4' of the image addition region Rs as the starting point.

In a case of the sixth modification, the specification unit 22 of the second information processing device 20 estimates the inclinations of the four arrows (or the solid lines) of the position specifying image Im2*f* included in the processed image Im4, similarly to the third modification. Then, the specification unit 22 obtains, as the representative point of the write region Rn1, the intersection between the arrow (or the solid lines) with the left upper vertex P1 of the image addition region Rs as the base point and the arrow (or the solid lines) with the right upper vertex P2' of the image addition region Rs as the base point, so that the position of the write region Rn1 in the processed image Im4 can be specified. In addition, the specification unit 22 obtains, as the representative point of the write region Rn2, the intersection between the arrow (or the solid lines) with the left lower vertex P3' of the image addition region Rs as the base point and the arrow (or the solid lines) with the right lower vertex P4' of the image addition region Rs as the base point, so that the position of the write region Rn2 in the processed image Im4 can be specified.

Further, the position specifying image Im2f illustrated in FIG. 14 has been provided as an example in which the left upper corner portion of the image is set as the image addition region Rs. However, another corner portion of the image may be set as the image addition region Rs, and the four arrows (or the solid lines) may be integrated and disposed in the image addition region Rs. Furthermore, a plurality of corner portions of the image each may be provided with the image addition region Rs, and the plurality of image addition regions Rs each may be provided with the four arrows (or the solid lines) integrated and disposed therein. In this case, it is possible to increase redundancy in the information for specifying the positions of the write regions Rn, and it is also possible to cope with the case where three write regions Rn or more are detected.

In addition, the position specifying image Im2f illustrated in FIG. 14 has been described to be able to specify the positions of the two write regions Rn1 and Rn2, using the similar pattern to the position specifying image Im2c of the third modification, but the invention is not limited thereto. For example, an image may be formed so as to specify the positions of the two write regions Rn1 and Rn2 using the similar patterns to the first modification and the second modification.

Seventh Modification

Figure 15:
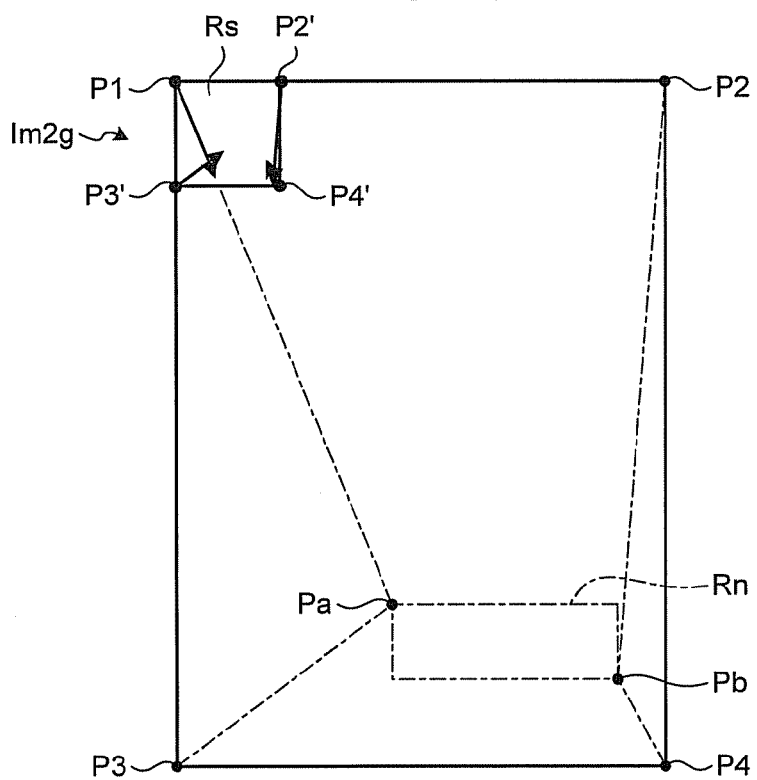
FIG. 15 is a diagram illustrating a position specifying image of a seventh modification.

FIG. 15 is a diagram illustrating a position specifying image Im2g of a seventh modification. Similarly to the fifth modification, the position specifying image Im2g of the seventh modification is on the assumption that the four arrows (or the solid lines) for obtaining the two vertexes Pa and Pb pairing the opposing corners of the write region Rn are integrated and disposed in one image addition region Rs, and the lengths of the respective arrows (or the solid lines) are set in proportion to distances to the vertexes Pa and Pb.

For example, in a case where the region of the left upper corner portion of the image is set as the image addition region Rs, the generation unit 13 of the first information processing device 10 generates an image as the position specifying image Im2g in which the following arrows are disposed in the image addition region Rs using the similar method to the fifth modification: the arrow which indicates a direction from the left upper vertex P1 of the image to the left upper vertex Pa of the write region Rn, having a length in proportion to the distance between P1 and Pa; the arrow which indicates a direction from the right upper vertex P2 of the image to the right lower vertex Pb of the write region Rn, having a length in proportion to the distance between P2 and Pb; the arrow which indicates a direction from the left lower vertex P3 of the image to the left upper vertex Pa of the write region Rn, having a length in proportion to the distance between P3 and Pa; and the arrow which indicates a direction from the right lower vertex P4 of the image to the right lower vertex Pb of the write region Rn, having a length in proportion to a distance between P4 and Pb.

In a case of the seventh modification, the specification unit 22 of the second information processing device 20 obtains the coordinate values of the two vertexes (for example, the left upper vertex Pa and the right lower vertex Pb) pairing the opposing corners of the write region Rn using the similar method to the fifth modification. Therefore, the position of the write region Rn in the processed image Im4 can be specified. Furthermore, in a case of the seventh modification, even when one of the two arrows for obtaining a vertex of the write region Rn is not exactly acquired, the coordinate values of the vertex of the write region Rn can be obtained based on the length of the other arrow. Therefore, the position of the write region Rn in the processed image Im4 can be specified.

Further, the position specifying image Im2g illustrated in FIG. 15 has been provided as an example in which the left upper corner portion of the image is set as the image addition region Rs. However, another corner portion of the image may be set as the image addition region Rs, and a plurality of arrows (or the solid lines) may be integrated and disposed in the image addition region Rs. Furthermore, a plurality of corner portions of the image each may be provided with the image addition region Rs, and the plurality of image addition regions Rs each may be provided with the plurality of arrows (or the solid lines) integrated and disposed therein. In this case, it is possible to increase redundancy in the information for specifying the positions of the write regions Rn.

In addition, in the position specifying image Im2g of the seventh modification, an additional small region may be provided besides the image addition region Rs in which the arrows (or the solid lines) are integrated and disposed therein as described above. In the additional small region, information representing the size of the write region Rn may be disposed.

Hardware Configuration of Information Processing Device

Figure 16:
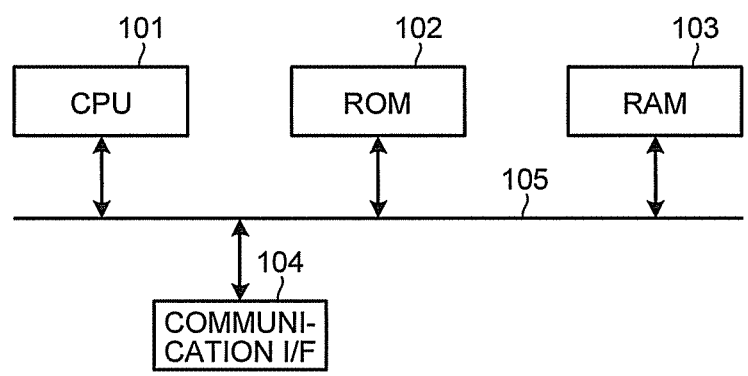
FIG. 16 is a diagram illustrating an example of hardware configurations of the first information processing device and the second information processing device.

The above-mentioned respective functions of the first information processing device 10 and the above-mentioned respective functions of the second information processing device 20 according to the embodiment may be implemented by causing, for example, the first information processing device 10 and the second information processing device 20 to execute a predetermined program. In this case, for example, as illustrated in FIG. 16, the first information processing device 10 and the second information processing device 20 have a hardware configuration using a typical computer, including a controller such as a CPU (Central Processing Unit) 101, a storage device such as a ROM (Read Only Memory) 102 and a RAM (Random Access Memory) 103, a communication I/F 104 which is connected to a network for communication, a bus 105 which is connected to the respective components, and the like.

The program executed in the first information processing device 10 and the second information processing device 20 may be recorded in a computer-readable recording medium such as a CD-ROM (Compact Disk Read Only Memory), a flexible disk (FD), a CD-R (Compact Disk Recordable), and a DVD (Digital Versatile Disc) in an installable or executable file format in order to be provided as a computer program product.

In addition, the program executed in the first information processing device 10 and the second information processing device 20 may be stored in a computer connected to a network such as the Internet, and then provided by downloading the program through the network. In addition, the program executed in the first information processing device 10 and the second information processing device 20 may be supplied or distributed through the network such as the Internet.

In addition, the program executed in the first information processing device 10 and the second information processing device 20 may be embedded in the ROM 102 for supply or the like in advance.

The program executed in the first information processing device 10 is configured in a module type including the respective processing units (the receiving unit 11, the detection unit 12, the generation unit 13, and the output unit 14) of the first information processing device 10. Further, as practical hardware, for example, a CPU 101 (a processor) reads the program from the above-mentioned recording medium to load the respective processing units described above on the main storage device, and thus the respective processing units described above are generated on the main storage device. Further, the first information processing device 10 may be configured such that some or all of the processing units described above may be realized using a dedicated hardware package such as an ASIC (Application Specific Integrated Circuit) or an FPGA (Field-Programmable Gate Array).

The program executed in the second information processing device 20 is configured in a module type including the respective processing units (the receiving unit 21, the specification unit 22, the recognition unit 23, and the output unit 24) of the second information processing device 20. Further, as practical hardware, for example, the CPU 101 (a processor) reads the program from the above-mentioned recording medium to load the respective processing units described above on the main storage device, and thus the respective processing units described above are generated on the main storage device. Further, the second information processing device 20 may be configured such that some or all of the processing units described above may be realized using a dedicated hardware package such as the ASIC or the FPGA.

Further, in the form processing system according to the embodiment, the first information processing device 10 and the second information processing device 20 are realized in individual devices, but the function of the first information processing device 10 and the function of the second information processing device 20 may be realized as two functions in a single information processing device. In this case, the information processing device has a first operation mode in which the device operates as the first information processing device 10, and a second operation mode in which the device operates as the second information processing device 20. These operation modes are switched to realize the two functions of the first information processing device 10 and the second information processing device 20.

In addition, the form processing system according to the embodiment has been described such that: the write position to be written with the process number is detected from the original image Im1 which is image data acquired by optically reading the ledger sheet LS1; the position specifying image Im2 used for specifying the write position is generated; and the process number is recognized based on the position specifying image Im2 from the processed image Im4 which is image data acquired by optically reading the ledger sheet LS2 obtained by printing the process number and the position specifying image Im2 on the ledger sheet LS1. However, the position specifying image Im2 and the image of the process number may be synthesized in the original image Im1 to generate the processed image Im4, and the process number may be recognized from the processed image Im4 based on the position specifying image Im2. In other words, after the position specifying image Im2 and the image of the process number are printed once, the printed image data itself may be handled without optically reading the printed images.

In addition, the embodiments described above has been described in connection to exemplary applications to the form processing system, but the applicable examples are not limited thereto. Further, the use of writing the additional information on a document with entries already written therein may be widely applied to any system and devices.

While certain embodiments have been presented, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
    a receiving unit configured to receive an original image, the original image being an image in which a region to which additional information is to be written is not predetermined;
    a detection unit configured to detect, as the region, a space least overlapped with pre-existing entries in the original image, from the original image;
    a generation unit configured to generate a position specifying image for specifying a position of the detected region in the original image, the position specifying image being to be added to a predetermined region in the original image; and
    an output unit configured to output the position specifying image.

2. The device according to claim 1,
    wherein the position specifying image represents coordinate values of the detected region in the original image.

3. The device according to claim 1,
    wherein the position specifying image includes an image that represents a horizontal position or a vertical position of the detected region and that is distinguished from images at other positions in the predetermined region of the original image.

4. The device according to claim 1,
    wherein the position specifying image includes an image that represents a direction from a representative point in the predetermined region of the original image toward a representative point of the detected region.

5. An information processing device comprising:
    a receiving unit configured to receive a processed image in which the position specifying image output from the information processing device according to claim 1 is added to the predetermined region of the original image, and the additional information is written in the detected region detected by the information processing device according to claim 1;
    a specification unit configured to specify the detected region in the processed image based on the position specifying image; and
    a recognition unit configured to recognize the additional information written in the specified detected region.

6. An information processing method comprising:
    receiving an original image, the original image being an image in which a region to which additional information is to be written is not predetermined;
    detecting, as the region, a space least overlapped with pre-existing entries in the original image, from the original image;
    generating a position specifying image for specifying a position of the detected region in the original image, the position specifying image being to be added to a predetermined region in the original image; and
    outputting the position specifying image.

7. A computer program product comprising a non-transitory computer-readable medium containing a program executed by a computer, the program causing the computer to execute:

receiving an original image, the original image being an image in which a region to which additional information is to be written is not predetermined;

detecting, as the region, a space least overlapped with pre-existing entries in the original image, from the original image;

generating a position specifying image for specifying a position of the detected region in the original image, the position specifying image being to be added to a predetermined region in the original image; and outputting the position specifying image.

* * * * *